United States Patent [19]

Hoerig et al.

[11] Patent Number: 4,679,649
[45] Date of Patent: Jul. 14, 1987

[54] MOTOR VEHICLE ENGINE MOUNTING ARRANGEMENT

[75] Inventors: Klaus Hoerig, Gross-Gerau; Hans-Joachim Gora, Bischofsheim, both of Fed. Rep. of Germany

[73] Assignee: General Motors Corporation, Detroit, Mich.

[21] Appl. No.: 791,754

[22] Filed: Oct. 28, 1985

[30] Foreign Application Priority Data

Dec. 5, 1984 [DE] Fed. Rep. of Germany ....... 3444297

[51] Int. Cl.$^4$ .............................................. B60K 5/00
[52] U.S. Cl. ..................................... 180/291; 188/285
[58] Field of Search ............... 180/291, 312, 299, 902; 188/299, 285

[56] References Cited

FOREIGN PATENT DOCUMENTS 36470 9/1981 European Pat. Off. ............ 180/291

Primary Examiner—John J. Love
Assistant Examiner—Eric D. Culbreth
Attorney, Agent, or Firm—R. L. Phillips

[57] ABSTRACT

The mounting of an engine with at least one hydraulically damped spring element on the body of a motor vehicle having a wheel which is spring-mounted with respect to the body. Movements of the engine as a result of irregularities in its path are damped by a displacement transducer placed between the body and the wheel, and the hydraulically damped spring element is operatively connected to the displacement transducer in such a way that as the signal from the displacement transducer increases as a result of a change in displacement between the body and the wheel, the hydraulic damping of the spring element increases.

3 Claims, 2 Drawing Figures

MOTOR VEHICLE ENGINE MOUNTING ARRANGEMENT

TECHNICAL FIELD

The invention pertains to the mounting of an engine with at least one hydraulically damped spring element, particularly a rubber metal mount, on the body of a motor vehicle with a wheel which is spring-mounted with respect to the body.

BACKGROUND OF THE INVENTION

The aim of this type of mounting is to isolate the engine as fully as possible from the vehicle body in terms of vibration, in order to improve the vibration comfort of the motor vehicle. This involves a conflict in goals between good vibration comfort on the one hand and good noise insulation on the other. Specifically, when the mounting of the engine has a high natural damping, so that the engine does not continue to oscillate after an excursion, but returns without oscillating, the engine noise (i.e., the natural operating noise of the engine between 40-200 Hz) is easily transmitted into the body as a result of which noise comfort is poor. If, on the other hand, the mounting of the engine only has a slight degree of natural damping, so that the engine oscillates following an excursion, this necessarily means poor riding comfort in the motor vehicle since the engine vibrations are subjectively perceived as disturbing. Such engine excursions are usually caused by passage of the vehicle over irregularities in the road which initially force an excursion of the wheel which is spring-mounted with respect to the body, which is then transmitted to the body itself, upon which, finally, the engine is mounted. An excursion of the body with respect to the engine therefore implies an excursion of the engine with respect to the body from which the engine then returns. In this connection, it is important to note that natural engine mount vibrations particularly occur between 8-10 Hz,, which is particularly disturbing to passengers whereas higher-frequency vibrations are perceived only as noise. On the other hand, excursions of the wheel with respect to the body have lower frequencies of about 2-3 Hz, although these are perceived by people simply as inevitable road irregularities and are not perceived as having a significant influence on the vehicle's vibration comfort.

This conflict in goals cannot be resolved in normal course with purely passive hydraulically damped spring elements.

U.S. Pat. No. 3,807,678 has already proposed that the excursion, particularly the acceleration, of a vibration-mounted mass be monitored, and that the damping intensity of the hydraulic spring element be adjusted on that basis. This technique, however, requires that the mass to be vibration-damped be already vibrating, i.e., that it already be in the state of excursion which is to be eliminated in the first place.

Hydraulically damped rubber metal mounts are known, for example, from German patent Nos. 2,905,091 and 3,010,723, in which two separate chambers are connected to one another by means of a throttle valve. When the rubber metal mount is loaded, one of the chambers is compressed so that the hydraulic fluid within it must pass into the other chamber, this flow being restricted by the valve.

SUMMARY OF THE PRESENT INVENTION

The basic purpose of the invention is to create a mounting of the type mentioned above, which does suppress the appearance of excursions or accelerations of the engine as a result of irregularities in the vehicle's path or road, i.e., forced wheel excursions.

According to the invention, this purpose is fulfilled by means of a displacement transducer between the body and the wheel, and by a hydraulically damped spring element, particularly a rubber metal mount, that is operatively connected to the displacement transducer in such a way that as the signal from the displacement transducer increases as a result of a change in displacement between the body and the wheel, the hydraulic damping of the spring element also increases. This can be realized, particularly, in the case of rubber metal mounts with two hydraulic chambers interconnected through a valve by the valve having a controllable throttle valve which is operatively connected to the displacement transducer in such a way that as the signal from the displacement transducer increases as a result of a change in displacement between the body and wheel, the throttle valve becomes increasingly closed, and vice versa.

This means that the significant variable being observed is not the excursion of the engine with respect to the body but that of the wheel with respect to the body, and that damping of the excursion of the engine with respect to the body must be damped to a corresponding extent. It is possible in this way to take advantage of the fortunate physical coincidence that the excursion must occur first between the wheel and the body, and that only thereafter is there an excursion of the body with respect to the engine. As a result, the excursion of the engine with respect to the body occurs later in time than that of the wheel with respect to the body. This makes it possible to find ways to damp the spring element between the engine and the body even before the appearance of an excursion of the engine with respect to the body, as a result of which the appearance of an excursion of the engine with respect to the body can be restricted from the very beginning. One can therefore state that the invention provides anticipatory mounting for the engine. As mentioned above, wheel excursions with respect to the body are not perceived as a diminution of vibration comfort, while on the other hand, the uncomfortable vibrations of the engine particularly between 8-10 Hz are prevented even as they occur, which may be equated with a dramatic improvement in the motor vehicle's vibration comfort.

It is preferred that the displacement transducer be connected to a bandpass filter which specifically allows only the natural engine mount vibration to pass; that the bandpass filter be connected to a threshold filter which only allows signals over a certain amplitude to pass; that the threshold filter be connected to an RMS value finder; and that the RMS value finder be connected to a servo drive which is operatively connected to the throttle valve. The bandpass filter will therefore preferably allow natural engine mount vibrations between 8 and 10 Hz to pass, while suppressing wheel excursion vibrations at about 2-3 Hz so that they cannot have an effect on the changes in the damping of the spring element. The band width of the bandpass filter should therefore substantially correspond to the steady-state resonance characteristic of the mounting with the engine. This means that higher frequencies will also be suppressed, i.e. those higher frequencies that affect noise comfort and must consequently be counteracted with other means, particularly known vibration damping measures. The threshold filter, which allows the passage of signals passing through the bandpass filter from the displacement sensor only above a certain amplitude, ensures that ordinary wheel excursions resulting from simple road surface roughness do not have any effect. These noise-type wheel excursions, by their very nature, do not produce major excursions of the engine with respect to the body and are therefore unnecessary and can be rejected by the threshold filter. The threshold value of the threshold filter can, if desired, be adjustable either manually or in relation to the forward speed of the vehicle. The RMS value finder creates a positive, averaged signal in a manner known in the art from the signal transmitted to it from the threshold filter; the RMS value of this signal from thee threshold filter most preferably representing the root of the quadratic average value formed over a specific time. This means that the servo drive for the throttle valve always receives a positive signal. As a result, regulation of the throttle valve is independent of the direction of the excursion between the body and the wheel as detected by the displacement transducer. All that is intended is that as the excursion between the wheel and the body increases, i.e., as the signal from the displacement transducer increases, the signal actuating the servo drive also increases, and conversely decreases as the signal output by the displacement transducer decreases, i.e., when the change in displacement between the wheel and the body is small. As a consequence, the servo drive is monotonically operatively connected to the throttle valve. This means that the throttling effect of the throttle valve is high for correspondingly high servo-drive actuation, and that conversely, the throttle valve throttles only slightly when the servo drive is only weakly acted upon. In addition, a person skilled in the art might be expected to insert an amplifier after the RMS value finder or before the servo drive. This amplifier would be a simple forward amplifier with no phase shift.

It is particularly preferred that the response time of the spring element, particularly the rubber metal mount, be less than the averaging time of the RMS value finder, and that this averaging time be less than the response time of the bandpass filter. The response time of the spring elements also includes, in this connection, the response time of the servo drive and the throttle valve. The spring element with the parts just mentioned should therefore respond to the output signal from the RMS value finder with practically no lag. At the same time, the averaging time of the RMS value finder should be less than the response time of the bandpass filter and should therefore to a certain extent allow inverse amplification from the RMS value finder through inverse amplification in the bandpass filter directly to the displacement transducer.

DESCRIPTION OF PREFERRED EMBODIMENT OF THE INVENTION

Figure 1:
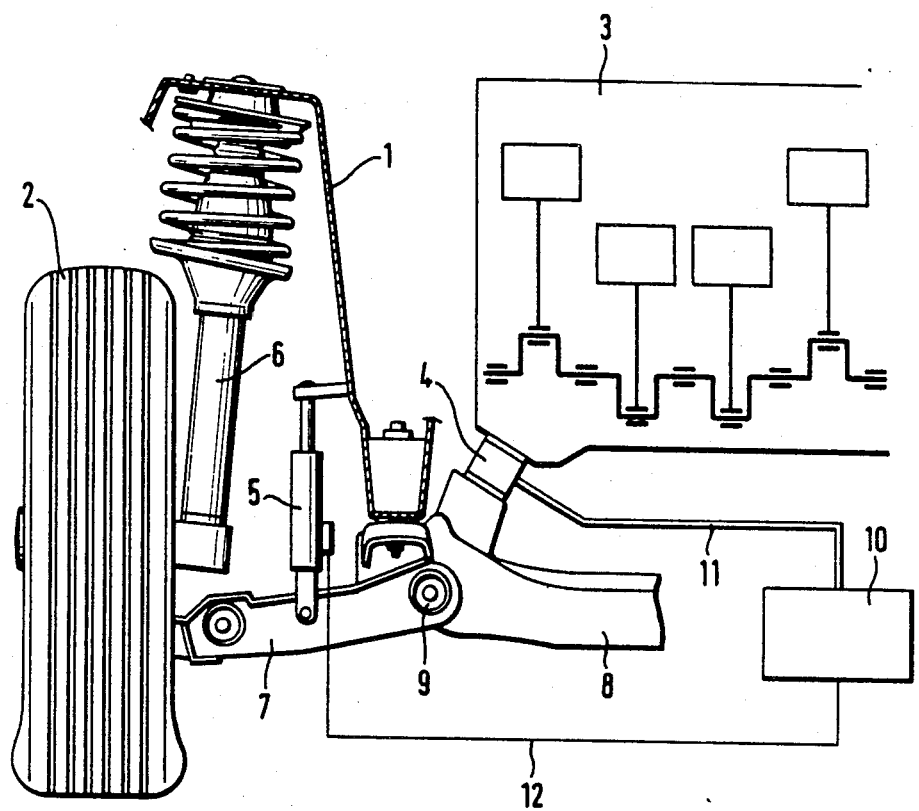

The invention will now be explained further, as an example, with reference to the following figures, which show:

FIG. 1: a schematic representation of the mounting of the engine and the wheel with respect to the body in accordance with the invention.

Figure 2:
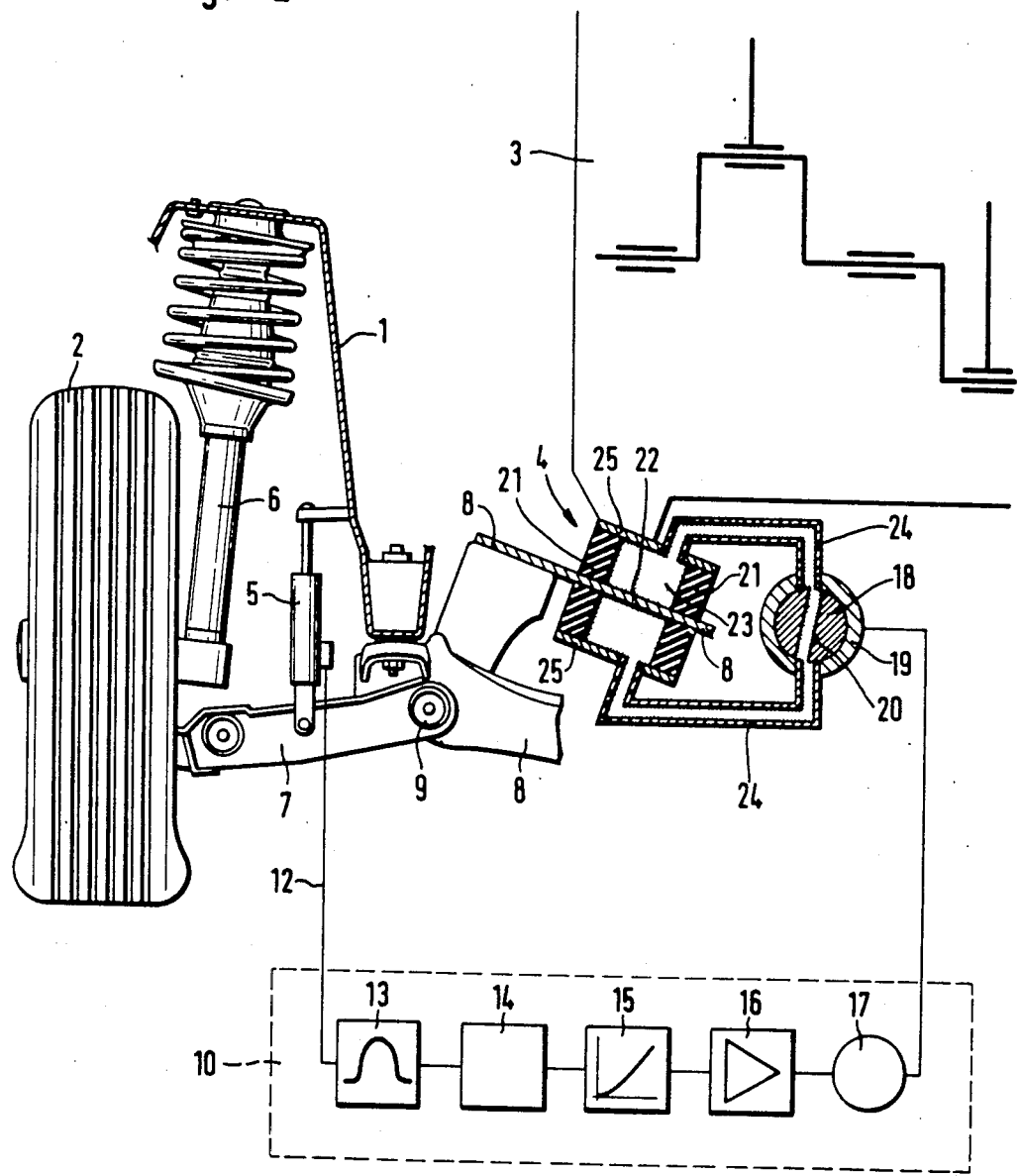

FIG. 2: a basic block diagram of the operative connection between the displacement transducer and the throttle valve in FIG. 1.

In FIG. 1, the wheel is labeled with the number 2. It is mounted on a control arm 7, which is spring-mounted on the body 1 by means of a shock absorber strut 6. The control arm 7 is mounted on the front frame 8 of the otherwise not illustrated vehicle though the joint 9, so that the wheel 2 can move on the control arm 7 by shortening or extending the shock absorber strut 6; this being accompanied by corresponding changes in distance between the wheel 2 and the chassis 1. Parallel to the shock absorber strut 6 is the displacement transducer 5 between the body 1 and the control arm 7. It therefore produces a signal corresponding to the distance between the wheel 2 and the body 1. This signal is conveyed through the control line 12 to the control means 10. The control means 10 is operatively connected through the control line 11 with an otherwise conventional rubber metal mount 4 having two separate chambers interconnected through a controllable throttle valve as described in greater detail later. In this embodiment, the control line 10 is connected to the controllable throttle valve and the active mount is attached to the body at the front frame 8 and carries the engine 3.

FIG. 2 is a schematic illustration of the mount 4. This active mount primarily has a rigid separation wall 22, on either side of which are chambers 23 which are surrounded by rubber parts 21 and closed off by cover plates 25. The rigid separation wall 22 is firmly attached to the front frame 8 of the motor vehicle, while the engine 3 is attached to one of the cover plates 25. When the engine 3 presses against the cover plate 25 to which it is attached, the chamber 23 located under it is compressed and its hydraulic fluid contents are forced into the closed-circuit pipeline 24 through the throttle valve 19 into the other chamber 23 with the unattached cover plate 25. Depending on the degree of throttling in the throttle valve 19, however, the passage of hydraulic fluid through the closed-circuit pipeline 24 from the one chamber 23 to the other chamber 23 is impeded, and the excursion rate of the engine 3 or the rate of change in volume in the corresponding chamber 23 is restricted. A change in the setting of the valve body 18 with the valve orifice 20 with respect to the inlet and outlet connecting the closed-circuit pipeline 24 to the throttle valve 19 creates a change in throttling effect. The throttle valve 19 could also be placed directly in the separation wall 22 between the chambers 23 and in this case, the closed-circuit pipeline would be eliminated. Control of the throttle valve 19, in this case meaning adjustment of the valve body 18, is effected by the displacement transducer 5 between the body 1 and the control arm 7 with the wheel 2 by the control means 10. The signal from the displacement transducer 5 is transmitted through the signal line 12 to the bandpass filter 13, from there to the threshold filter 14, and from there conveyed to the RMS value finder 15, whose output, passing if necessary through the amplifier 16, then actuates the servo drive 17 which finally controls the position of the valve body 18.

The above described preferred embodiment is illustrative of the invention which may be modified within the scope of the appended claims.

The embodiments of the invention in which an exclusive property or privilege is claimed are defined as follows:

1. Mounting of an engine with at least one hydraulically damped spring element on a body of a motor vehicle having a wheel which is spring mounted with respect to the body characterized by a displacement transducer between the body and the wheel, and the hydraulically damped spring element including two chambers in fluid connection through a throttle valve operatively connected to the displacement transducer so that as the signal from the displacement transducer increases as a result of a variation in distance between the body and the wheel hydraulic damping of the spring element increases.

2. Mounting according to claim 1, characterized by the displacement transducer connected to a bandpass filter which lets through only the natural vibration of the engine mounting, the bandpass filter connected to a threshold filter which lets through only signals above a given amplitude, the threshold filter connected to a root-mean-square value finder, and the root-mean-square value finder connected to a servo drive which is operatively connected to the throttle valve.

3. Mounting according to claim 2, characterized by the response time of the spring element being shorter than the time taken by the root-mean-square value finder to find the mean, and this time taken to find the mean being shorter than the response time of the bandpass filter.

* * * * *